(12) United States Patent
Johnson et al.

(10) Patent No.: US 9,800,034 B2
(45) Date of Patent: Oct. 24, 2017

(54) WALL PLATE SYSTEM

(71) Applicant: ABL IP Holding LLC, Decatur, GA (US)

(72) Inventors: John Richard Johnson, Flowery Branch, GA (US); Chukwunonso Nzubechukwu Okoli, Decatur, GA (US); John T. Hickok, Social Circle, GA (US); Richard Lee Westrick, Jr., Social Circle, GA (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

(21) Appl. No.: 15/148,060

(22) Filed: May 6, 2016

(65) Prior Publication Data

US 2017/0025835 A1  Jan. 26, 2017

Related U.S. Application Data

(60) Provisional application No. 62/194,483, filed on Jul. 20, 2015.

(51) Int. Cl.
*H02G 3/08* (2006.01)
*H02G 3/14* (2006.01)
*H02G 3/10* (2006.01)

(52) U.S. Cl.
CPC .............. *H02G 3/083* (2013.01); *H02G 3/14* (2013.01); *H02G 3/10* (2013.01)

(58) Field of Classification Search
USPC ........................................................ 174/66
See application file for complete search history.

(56) References Cited

U.S. PATENT DOCUMENTS

| | | | |
|---|---|---|---|
| 3,729,572 A | * | 4/1973 | Helin ................ H02G 3/14 |
| | | | 174/66 |
| 4,017,137 A | | 4/1977 | Parks |
| 4,102,466 A | | 7/1978 | Jadatz |
| 4,505,403 A | | 3/1985 | Bowden, Jr. et al. |
| 4,552,421 A | | 11/1985 | Drapkin |
| 4,865,556 A | | 9/1989 | Campbell et al. |
| 4,972,045 A | | 11/1990 | Primeau |
| 5,044,983 A | | 9/1991 | Mahaney et al. |
| 5,073,681 A | | 12/1991 | Hubben et al. |
| 5,379,972 A | | 1/1995 | Decore et al. |
| 5,700,978 A | * | 12/1997 | Huff .................. H02G 3/14 |
| | | | 174/66 |
| 5,723,817 A | | 3/1998 | Arenas et al. |

(Continued)

*Primary Examiner* — Dhirubhai R Patel
(74) *Attorney, Agent, or Firm* — Kilpatrick Townsend & Stockton, LLP (57) ABSTRACT

A wall plate and system for covering an electrical component in an electrical box. The wall plate includes a base plate having a central aperture, and two trim pieces that join at the sides of the base plate to complete the wall plate. The base plate may include two side edges and wing portions extending from the side edges, and the trim pieces slide onto the respective side wing portions. The trim pieces may have features to engage a mounting plate attached to the electrical box or the electrical component, to capture the wall plate over the electrical box. A locking mechanism may be provided to lock the trim pieces in their inward positions against the base plate. The wall plate may be attachable without the use of tools or fasteners.

20 Claims, 9 Drawing Sheets

(56) References Cited

U.S. PATENT DOCUMENTS

| | | |
|---|---|---|
| 5,789,705 A | 8/1998 | Cancellieri et al. |
| 5,853,236 A | 12/1998 | Rogers et al. |
| 5,900,583 A | 5/1999 | Russo |
| 5,901,485 A | 5/1999 | Kiggins |
| 5,907,126 A | 5/1999 | Cancellieri et al. |
| 5,942,724 A | 8/1999 | Russo et al. |
| 5,957,414 A | 9/1999 | Perrignon et al. |
| 5,981,875 A * | 11/1999 | Kesler .................... H02G 3/14 174/66 |
| 6,010,361 A | 1/2000 | Goudal et al. |
| 6,102,360 A | 8/2000 | Clegg et al. |
| 6,150,610 A | 11/2000 | Sutton |
| 6,313,403 B1 | 11/2001 | Livingston et al. |
| 6,322,083 B1 | 11/2001 | Dowd et al. |
| 6,335,484 B1 | 1/2002 | Jarry et al. |
| 6,353,181 B1 | 3/2002 | Jarry et al. |
| 6,423,899 B1 | 7/2002 | Reiker |
| 6,429,374 B2 | 8/2002 | Buard |
| 6,455,780 B2 | 9/2002 | Bellanger |
| 6,469,250 B1 | 10/2002 | Decore et al. |
| 6,508,452 B2 | 1/2003 | Destruel |
| 6,563,046 B1 | 5/2003 | Jarry et al. |
| 6,599,056 B1 | 7/2003 | Piole et al. |
| 7,009,108 B2 | 3/2006 | Vargas et al. |
| 7,026,553 B2 | 4/2006 | Levesque et al. |
| 7,059,895 B2 | 6/2006 | Murano |
| 7,112,744 B1 * | 9/2006 | DeCosta .................. H02G 3/14 174/135 |
| 7,154,052 B2 | 12/2006 | Stempinski |
| 7,195,517 B1 | 3/2007 | Savicki, Jr. |
| 7,230,182 B1 | 6/2007 | Gates |
| 7,262,371 B2 | 8/2007 | Makwinski et al. |
| 7,416,310 B1 | 8/2008 | Savicki, Jr. |
| 7,456,366 B2 | 11/2008 | Makwinski et al. |
| 7,470,145 B1 | 12/2008 | Savicki, Jr. |
| 7,544,900 B2 | 6/2009 | Makwinski et al. |
| 7,554,033 B1 | 6/2009 | Bhosale et al. |
| 7,554,036 B1 * | 6/2009 | DeCosta .................. H02G 3/14 174/53 |
| 7,576,285 B1 | 8/2009 | Savicki, Jr. |
| 7,586,040 B1 | 9/2009 | Bala et al. |
| 7,602,619 B2 | 10/2009 | Fabrizi |
| 7,635,110 B2 | 12/2009 | Galasso et al. |
| 7,692,094 B1 * | 4/2010 | DeCosta ................ H02G 3/083 174/66 |
| 7,708,418 B2 | 5/2010 | Fabrizi et al. |
| 7,741,568 B2 | 6/2010 | Makwinski et al. |
| 7,758,234 B1 | 7/2010 | Savicki, Jr. et al. |
| 7,785,138 B2 | 8/2010 | Bonnassieux et al. |
| 8,093,510 B2 | 1/2012 | Makwinski et al. |
| 8,237,064 B2 | 8/2012 | Trolese et al. |
| 8,334,459 B2 | 12/2012 | Chaumeny et al. |
| 8,350,153 B1 * | 1/2013 | DeCosta .................. H02G 3/14 174/135 |
| 8,398,039 B2 | 3/2013 | Murano et al. |

* cited by examiner

WALL PLATE SYSTEM

This application claims the benefit of U.S. Provisional Patent Application No. 62/194,483 filed Jul. 20, 2015 and titled "Wall Plate System", the entire disclosure of which is hereby incorporated by reference herein for all purposes.

BACKGROUND OF THE INVENTION

Wall plates are positioned on a wall over light switches, outlets, controls, etc. to impart a polished appearance to the installation. A wall plate is typically mounted onto and over an exposed mounting plate connected to an electrical box in the wall. Wall plates have historically been mounted onto the mounting plates with screws or other mechanical fasteners, thus requiring tools both for their installation and removal/replacement. Wall plates have been designed that eliminate the need for unsightly mechanical fasteners. Rather, such plates snap-fit onto a mounting plate to secure the wall plate to the wall. However, a pry tool is still required for their removal. The required tool is an inconvenience to the user, and the process of prying the wall plate off of the mounting plate risks damaging the wall plate and/or the surrounding wall.

SUMMARY OF THE INVENTION

According to one aspect, a wall plate system for covering an electrical component in an electrical box comprises a base plate defining a central aperture and having two opposing side edges. At least one wing portion extends from each of the two side edges. The wall plate system further includes two trim pieces. Each of the two trim pieces is configured to slide respectively onto the at least one wing portion extending from one of the two opposing side edges of the base plate.

BRIEF DESCRIPTION OF THE INVENTION

DETAILED DESCRIPTION OF THE DRAWINGS

Embodiments of the present invention relate to a wall plate that may be installed on a wall without the use of tools and without the need for mechanical fasteners.

Figure 1:
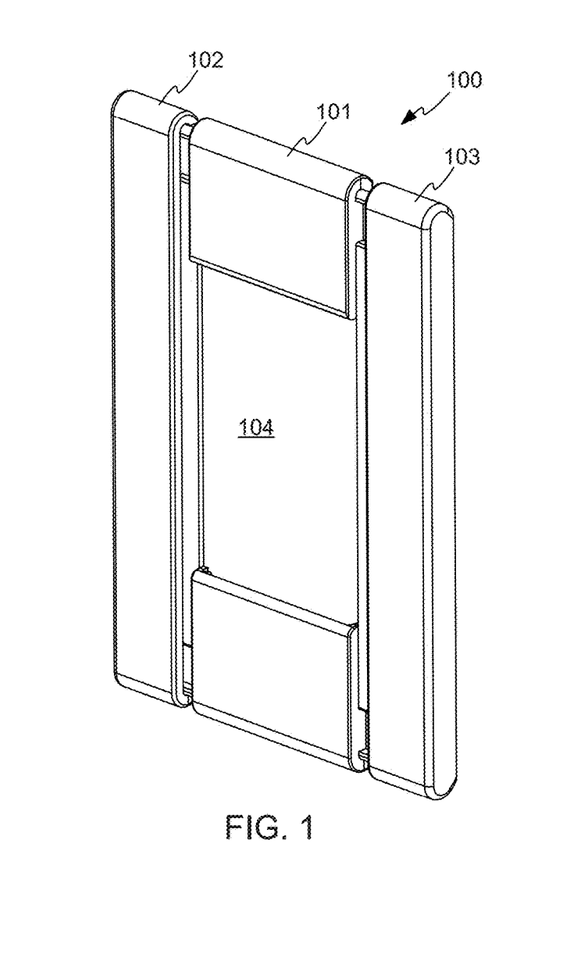
FIG. 1 is a front perspective view of a wall plate in accordance with embodiments of the invention, in an open position.
Figure 2:
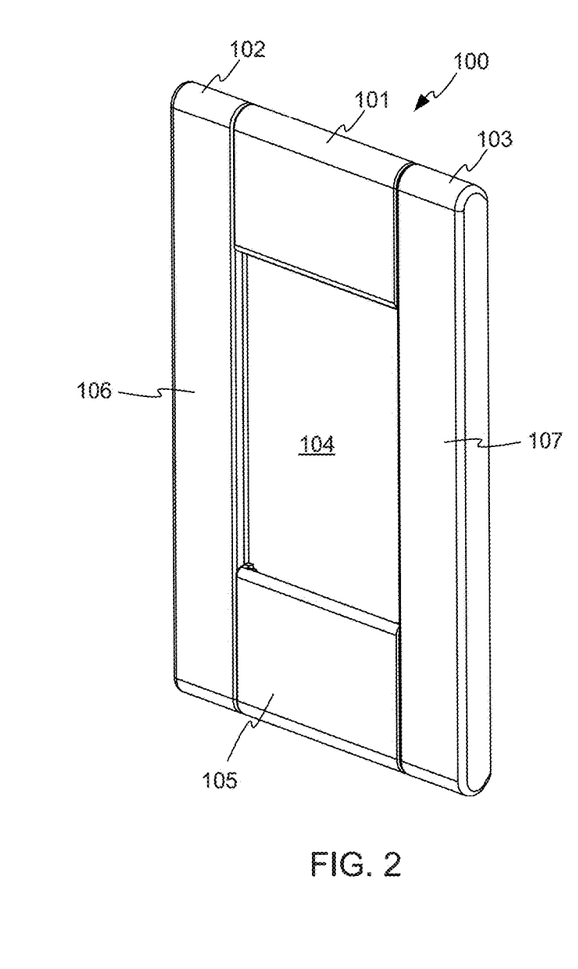
FIG. 2 is a front perspective view of the wall plate of FIG. 1, in a closed position.
Figure 3:
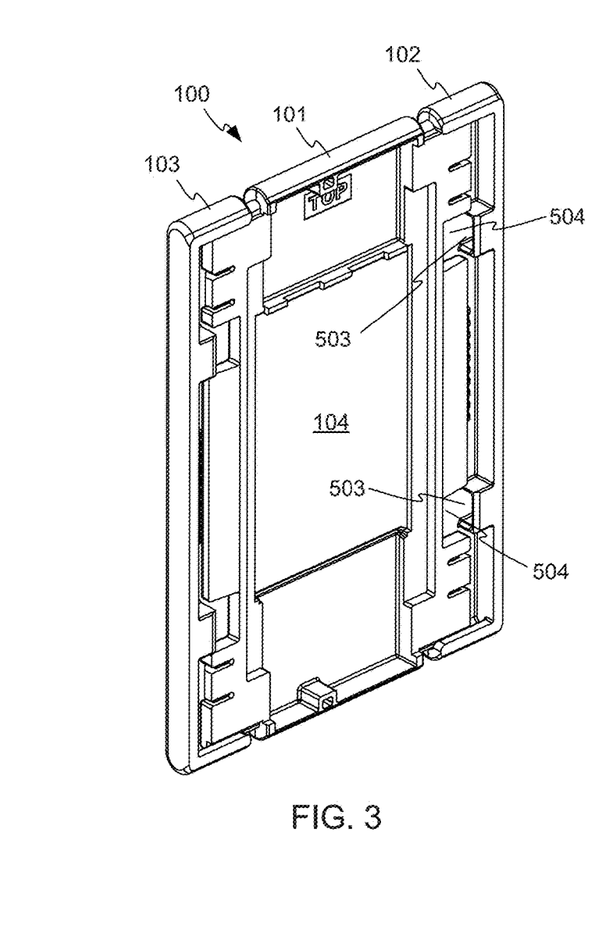
FIG. 3 is a rear perspective view of the wall plate of FIG. 1, in an open position.

FIGS. 1-3 illustrate a wall plate 100 in accordance with embodiments of the invention. FIGS. 1 and 3 illustrate the wall plate 100 in an open position, and FIG. 2 illustrates the wall plate 100 in a closed position. The wall plate 100 includes a base plate 101 flanked on each side by a trim piece 102, 103 that is moveable relative to the base plate 101 in that the trim pieces 102, 103 can slide toward and away from the base plate 101. For example, FIG. 1 shows the wall plate 100 in an "open" position, with the trim pieces 102 and 103 moved outward from the base plate 101, and FIG. 2 shows the wall plate 100 in a "closed" position with the trim pieces 102, 103 moved inward toward the base plate 101. A front face 105 of the base plate 101 combines with front faces 106 and 107 of the trim pieces 102 and 103 to form a decorative front face of the wall plate 100.

The base plate 101 includes a central aperture 104 that, in use, will align with the light switches, outlets, controls, etc. on a wall. See FIG. 9.

Figure 4:
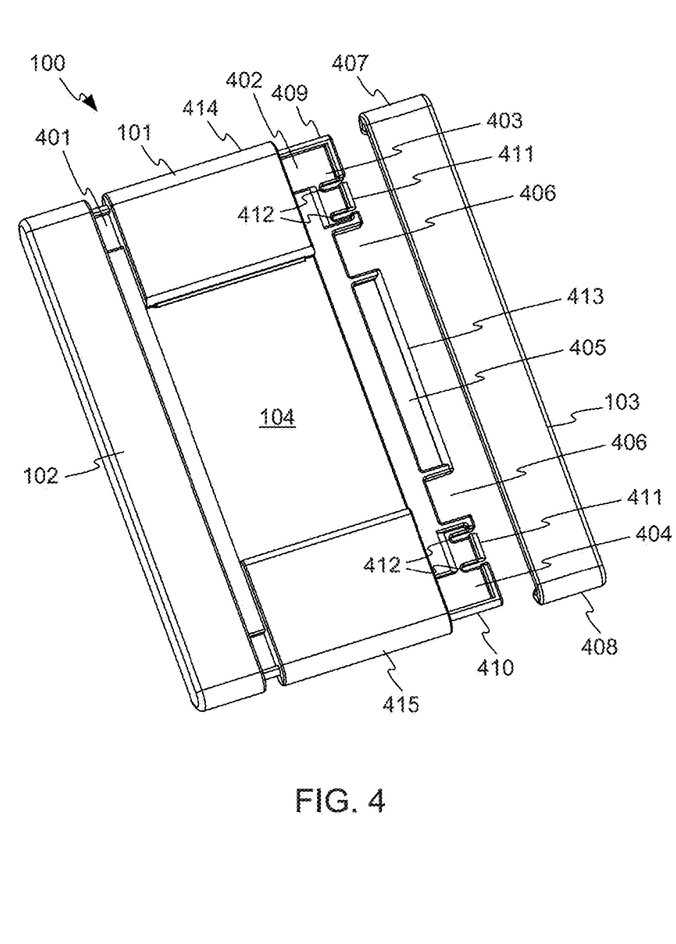
FIG. 4 is a front perspective view of the wall plate of FIG. 1, partially disassembled.

FIG. 4 shows the wall plate 100 partially disassembled. A side wing 401, 402 extends from each side of the base plate 101 for engagement with one of the trim pieces 102 and 103. The side wing 401, 402 can be any geometry but preferably includes at least one cut-out 406 to receive a side tab of a mounting plate, as discussed below.

In the illustrated and non-limiting embodiment, each side wing 401, 402 includes an upper wing portion 403, a lower wing portion 404, and a central wing portion 405. The upper and lower wing portions 403 and 404 are separated from the central wing portion 405 by cut-outs 406.

Each trim piece 102, 103 has an upper edge 407 and a lower edge 408 that is shaped to receive the respective upper and lower edge 409, 410 of the side wing 401, 402 such that the trim piece 102, 103 may not be easily lifted upwardly off of the base plate 101 but can slide relative to the base plate 101. The upper and lower edges 407, 408 of the trim piece 102, 103 and the upper and lower edges 409, 410 of the side wing 401, 402 should complement each other to permit such sliding between the trim piece 102, 103 and the base plate 101. By way only of example, in some examples the upper and lower edge 407, 408 of the trim piece 102, 103 has a curved J-shaped channel that receives the curved upper and lower edges 409, 410 of the side wing 401, 402. The upper and lower edges 407, 408 of each trim piece 102, 103 may match the shape of upper and lower edges 414 and 415 of the base plate 101.

Figure 5:
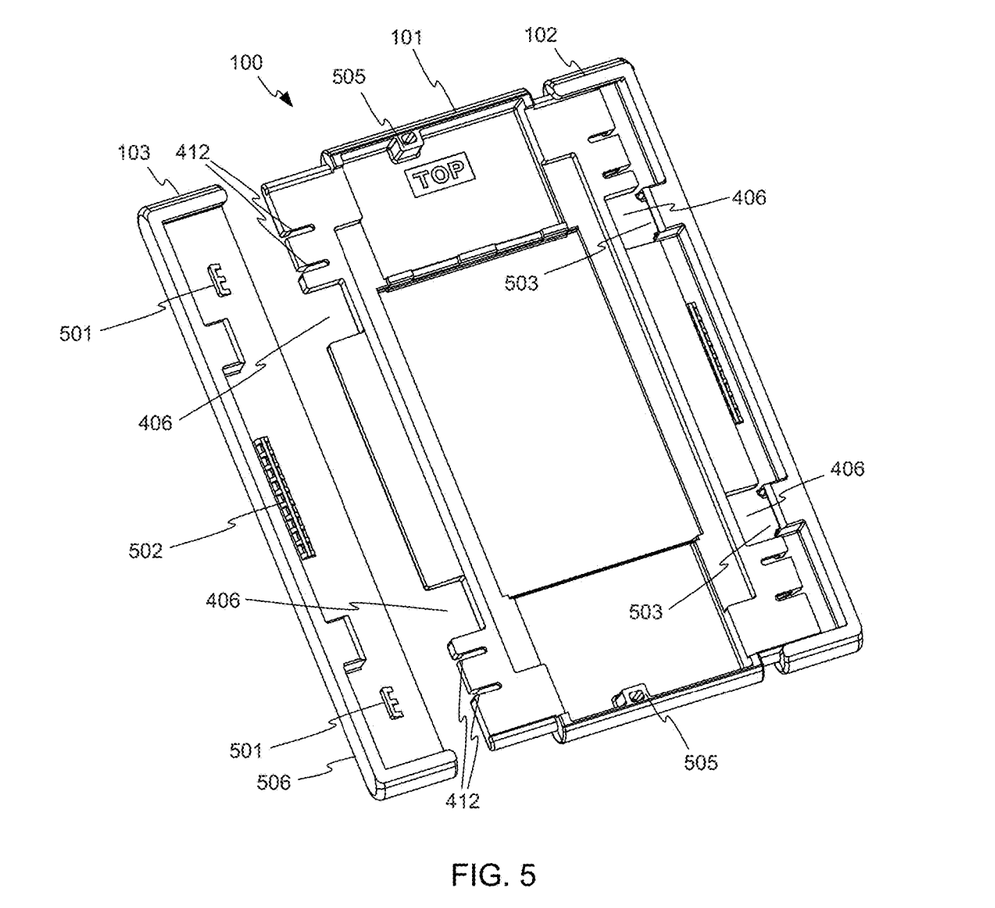
FIG. 5 is a rear perspective view of the wall plate of FIG. 1, partially disassembled.

The trim pieces 102, 103 may be prevented from sliding completely off of the base plate 101 using a variety of techniques, but preferably are held to the base plate 101 using a fastener-free method, such as a snap-fit connection. By way only of example, one or more hooks 411 provided on a base plate 101 side wing 401, 402 may engage a least one tab provided on the trim piece 102, 103. FIG. 5 shows a back view of the partially-disassembled wall plate 100, showing tabs 501 on the trim piece 103, for engaging with the hook 411 (which is not visible in FIG. 5). Similar tabs may be provided on the other trim piece 102.

When the trim piece 102, 103 is slid onto the base plate 101, the hooks 411 clear or snap over the tabs 501 to hold the trim piece 102, 103 and base plate 101 together. The tabs 501 may include a sloped surface to facilitate this engagement. Similarly, the trim piece 102, 103 can be removed from the base plate 101 by lifting the upper and lower wing portions 403 and 404 so that the hooks 411 clear the tabs 501. Relief slots 412 can be provided in the upper and lower wing portions 403 and 404 to facilitate this engagement and disengagement. The tab(s) 501 is preferably provided on the trim piece 102, 103 a distance from the outer side edge 506 of the trim piece 102, 103. This permits relative sliding between the base plate 101 and trim piece 102, 103 to allow for opening and closing of the trim piece 102, 103 on the base plate 101, but abutment of the hook(s) 411 and tab(s) 501 prevent disengagement between the two pieces.

The hooks 411 and tabs 501 are one example of a first retaining mechanism for attaching the trim pieces 102 and 103 to the base plate 101. When the retaining mechanism is engaged, the respective trim piece 102, 103 is attached to the base plate 101 but is still able to slide inward and outward in a limited range between inward and outward positions on the respective wing portion 403, 404 of the base plate 101. In this example, the retaining mechanism is a snap-fit connection.

Each central wing portion 405 of the base plate 101 may further include a raised lip 413 (see FIG. 4), and each of the trim pieces 102, 103 may include a ridge 502 on its back side (see FIG. 5). Positive engagement between the ridge 502 on the trim piece 102, 103 and the lip 413 on the central wing portion 405 helps retain the trim piece 102, 103 in the open and closed positions relative to the base plate 101. For example, abutment of the ridge 502 and central wing portion 405 when the ridge 502 is positioned exterior the central wing portion 405 (see FIG. 5) helps to retain the trim piece 102, 103 in the open position while abutment of the ridge 502 and the central wing portion 405 when the ridge 502 is positioned interior the central wing portion 405 helps to retain the trim piece 102, 103 in the closed position. As the trim piece 102, 103 is pushed inward toward the base plate 101, the lip 413 snaps over the ridge 502 to provide the positive engagement in the closed position.

The lips 413 and ridges 502 are an example of a second retaining mechanism that is engaged when each respective trim piece 102, 103 is moved to its inward position with respect to the base plate 101 to retain the respective trim piece 102, 103 in the inward (or closed) position. In this example, the retaining mechanism is a snap-fit connection.

Finally, at least one pocket 503 may be formed in each trim piece 102, 103 (see FIGS. 3 and 5) and received in cut-outs 406 of the base plate 101 side wings 401, 402. The purpose of the pocket(s) 503 is discussed below.

Figure 6:
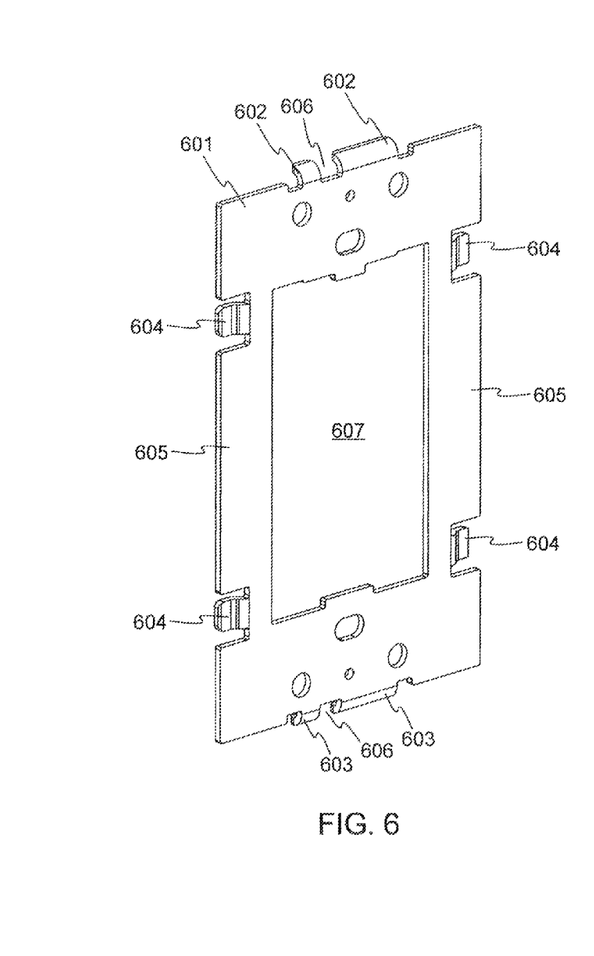
FIG. 6 is a perspective view of a mounting plate, in accordance with embodiments of the invention.
Figure 7:
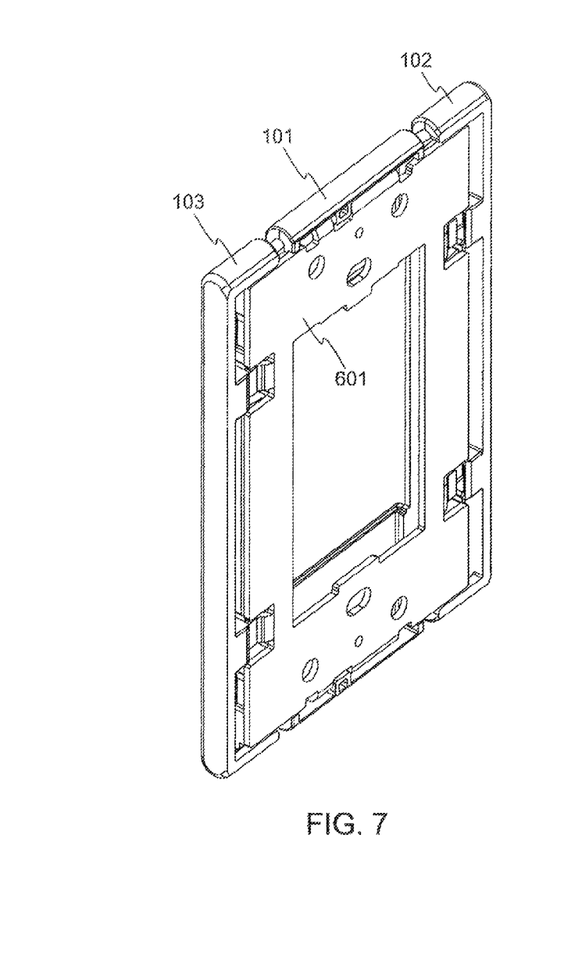
FIG. 7 is a rear perspective view of the wall plate of FIG. 1 in position to mount to the mounting plate of FIG. 6.
Figure 8:
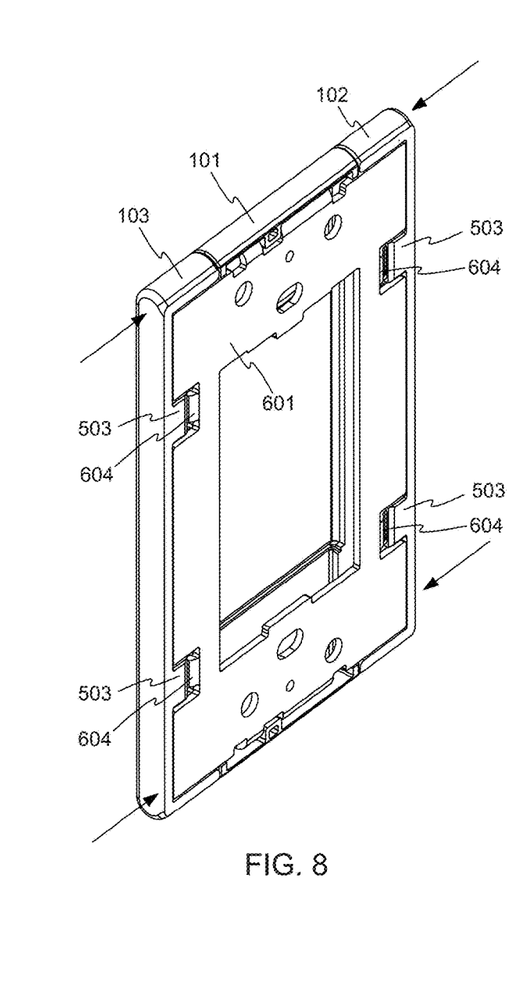
FIG. 8 is a rear perspective view of the wall plate of FIG. 1 mounted to the mounting plate of FIG. 6.

One embodiment of a mounting plate 601 is illustrated in FIGS. 6-8. The mounting plate 601 includes at least one upper mounting tab 602 and at least one lower mounting tab 603. At least one side tab 604 extends upwardly from each side of the mounting plate 601 (two are shown on each side in the figures). That is, each side tab 604 is offset from one of side portions 605 of the mounting plate 601. The mounting plate 601 also defines a central aperture 607, configured to coincide with the central aperture 104 of the base plate 101.

In use, the mounting plate 601 is attached to the electrical box or to the electrical component in the electrical box (if not already attached) in a conventional manner. To secure the wall plate 100 onto the mounting plate 601, the trim pieces 102, 103 are slid outwardly relative to the base plate 101 into the open position. The upper edge 414 of the base plate 101 (which is shown as curved) is positioned over the upper mounting tab 602 of the mounting plate 601 (also shown as curved), after which the wall plate 100 is rotated downwardly so that the lower edge 415 of the base plate 101 is positioned over the lower mounting tab 603 of the mounting plate 601. See FIG. 7. When this happens, the side tab(s) 604 extending from each side of the mounting plate 601 will be located in the cut-outs 504 provided along the side wings 401, 402 of the base plate 101. To lock the wall plate 100 onto the mounting plate 601, the trim pieces 102, 103 are slid inwardly so as to abut the base plate 101. See FIG. 8. This movement results in the pocket(s) 503 on each trim piece 102, 103 moving over and trapping or capturing the side tabs 604 of the mounting plate 601 to secure the wall plate 100 to the mounting plate 601. Note that in some embodiments, there need be no engagement between the upper and lower edges 414, 415 of the base plate 101 and the mounting plate 601. Rather, the wall plate 100 can simply be directly positioned over the mounting plate 601 (i.e., without relative rotation between the wall plate 100 and mounting plate 601) and the trim pieces 102, 103 used to secure the wall plate 100 on the mounting plate 601 as described above.

The reverse process may be used to remove the wall plate 100 from the mounting plate 601. Thus, when the trim pieces 102, 103 are moved (easily by hand) to their open position, the wall plate 100 can be installed and removed freely; yet when the trim pieces 102, 103 are closed (easily by hand), they secure the wall plate 100 to the mounting plate 601. This design allows removal of the wall plate 100 by simply sliding the trim pieces 102, 103 to their open position and removing the wall plate 100 from the mounting plate 601, thus preventing the need for a pry tool and the potential damage the prying process may do to the wall plate 100 or building surfaces. Thus, embodiments of the wall plate system represent a versatile design that allows for tool-less and intuitive installation and removal without any visible fasteners.

In some embodiments, the wall plate 100 may be positioned on the mounting plate 601 in either vertical orientation. However, it may be desirable in some instances to provide the wall plate 100 and/or mounting plate 601 such that the wall plate 100 may only be positioned and/or locked onto the mounting plate 601 in one orientation. In such instances, alignment features may be provided on either or both of the wall plate 100 and mounting plate 601. In the illustrated embodiment, an off-center alignment aperture 606 is provided in the upper and lower mounting tabs 602, 603 of the mounting plate 601. See FIG. 6. Corresponding alignment tabs 505 are located on the base plate 101 of the wall plate 100. See FIG. 5. In order to secure the wall plate 100 to the mounting plate 601, the wall plate 100 must be oriented so that the alignment tabs 505 on the base plate 101 can seat in the alignment apertures 606 on the mounting plate 601.

Figure 9:
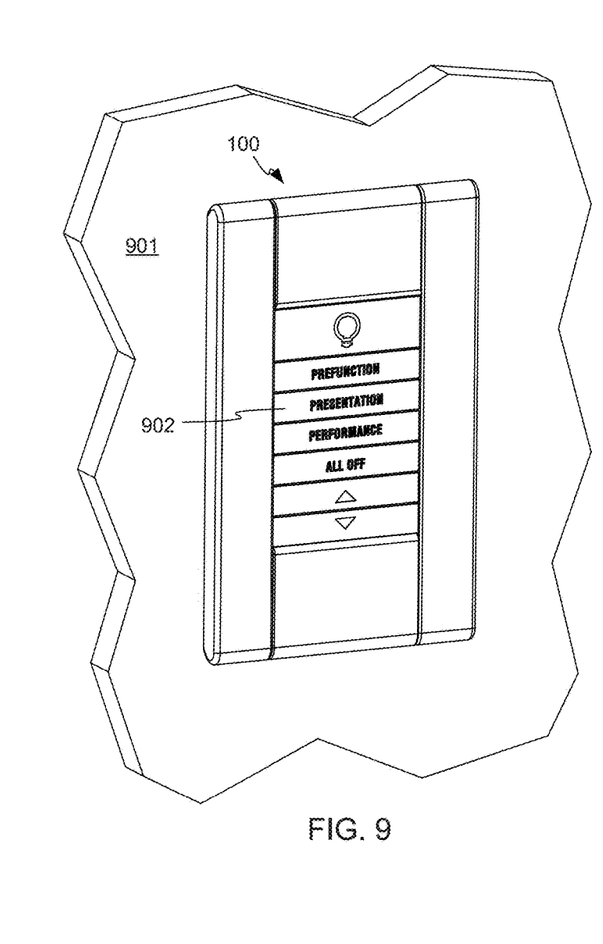
FIG. 9 is a front perspective view of the wall plate of FIG. 1, installed on a wall.

FIG. 9 shows a front view of the wall plate 100 in its installed configuration, mounted to a wall 901 and covering a multi-function switch 902 that has been mounted in the electrical box (not visible) behind the wall plate 100. The multi-function switch 902 is but one example of an electrical component that can be mounted in an electrical box and covered by a wall plate in accordance with embodiments of the invention. For example, other electrical components with which the wall plate 100 may be used include, without limitation, mains power outlets, rocker switches, toggle switches, cable television outlets, telephone system connections, computer network connections, wireless switches, or other electrical components.

Figure 10:
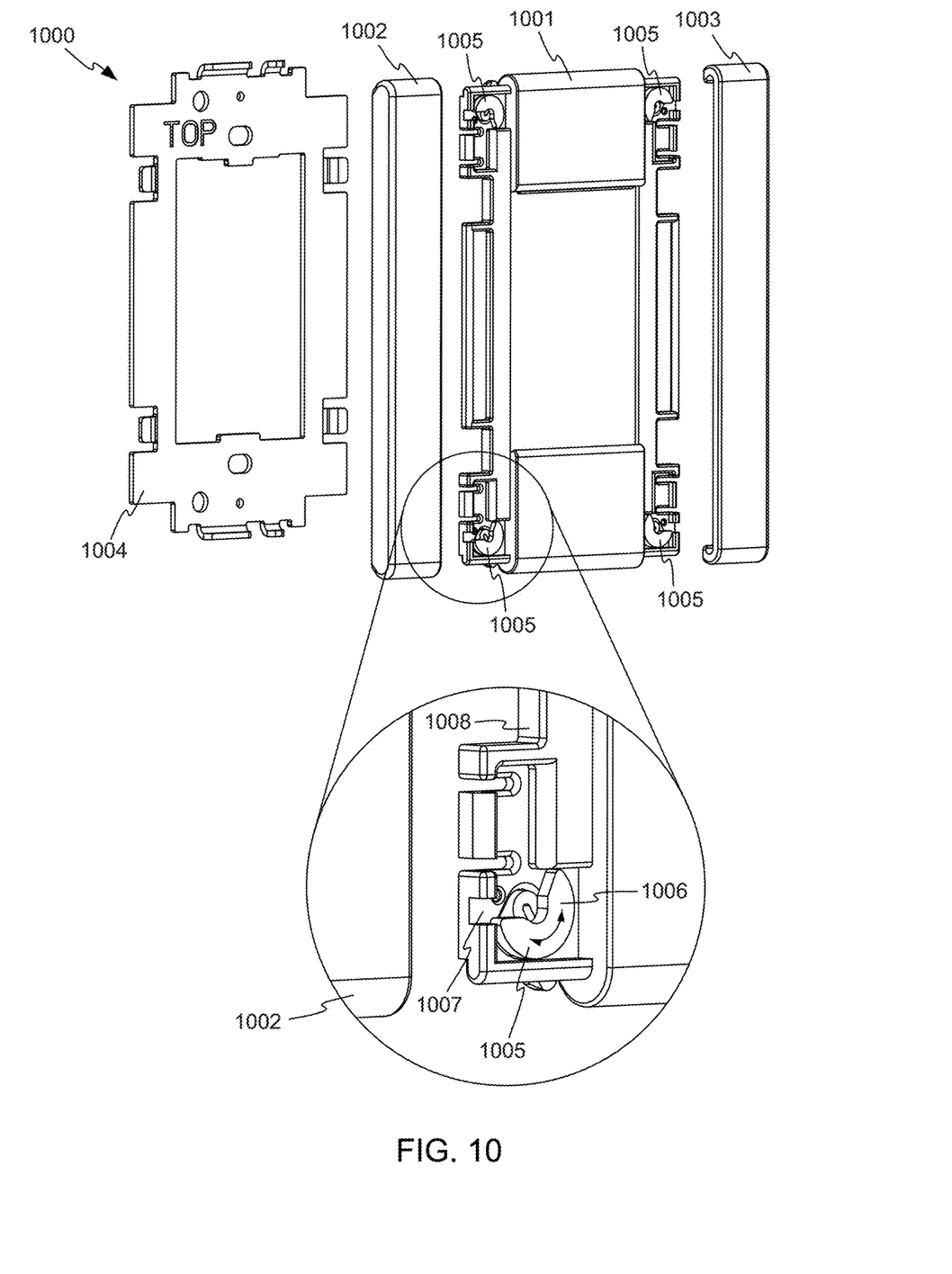
FIG. 10 is a front exploded perspective view of a wall plate system including a latch, in accordance with embodiments of the invention.
Figure 11:
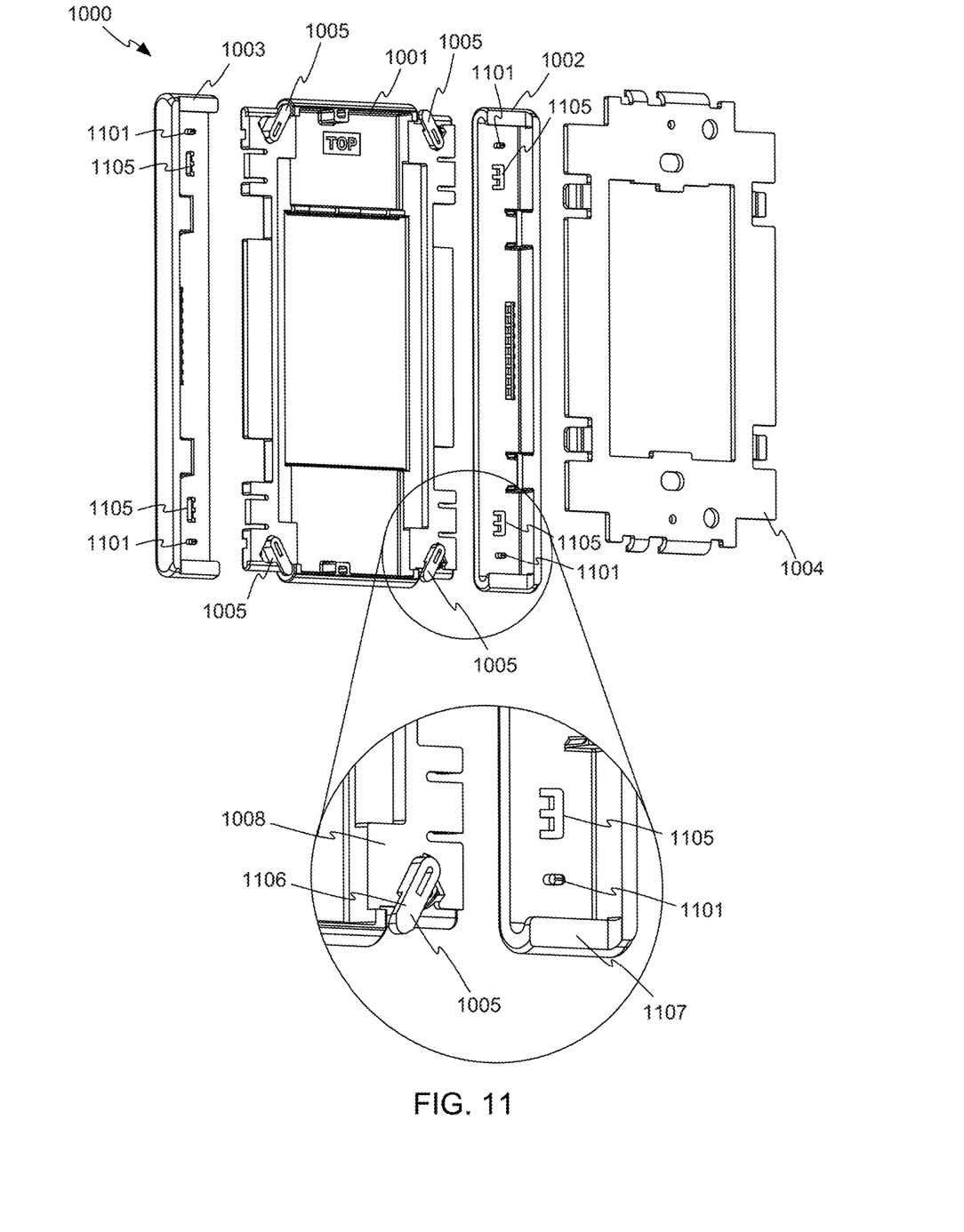
FIG. 11 is a rear exploded perspective view of the wall plate system of FIG. 10.

In some embodiments, for additional security the trim pieces 102, 103 may be locked in position relative to the base plate 101. By way only of example, FIGS. 10 and 11 illustrate a wall plate system 1000 in accordance with such an embodiment. Similar to the wall plate system described above, the wall plate system 1000 includes a base plate 1001 and two trim pieces 1002 and 1003, and may include a mounting plate 1004. In the illustrated embodiment, upstanding posts 1101 extend from the trim pieces 1002, 1003 (in this case, but not necessarily, proximate the tabs 1105). See FIG. 11. Latches 1005 are provided on the side wings 1008 of the base plate 1001. See FIGS. 10 and 11. Each latch 1005 includes a partial disc 1006 connected to and rotatable by an arm 1106. See the magnified portions of FIGS. 10 and 11. Moreover, an ingress/egress slot 1007 is provided in the upper and lower side wings 1008 adjacent each latch 1005. Rotation of the arm 1106 effectuates rotation of the partial disc 1006 so that the partial disc 1006 either blocks or opens access to the ingress/egress slot 1007. See FIGS. 10 and 11.

Figure 12:
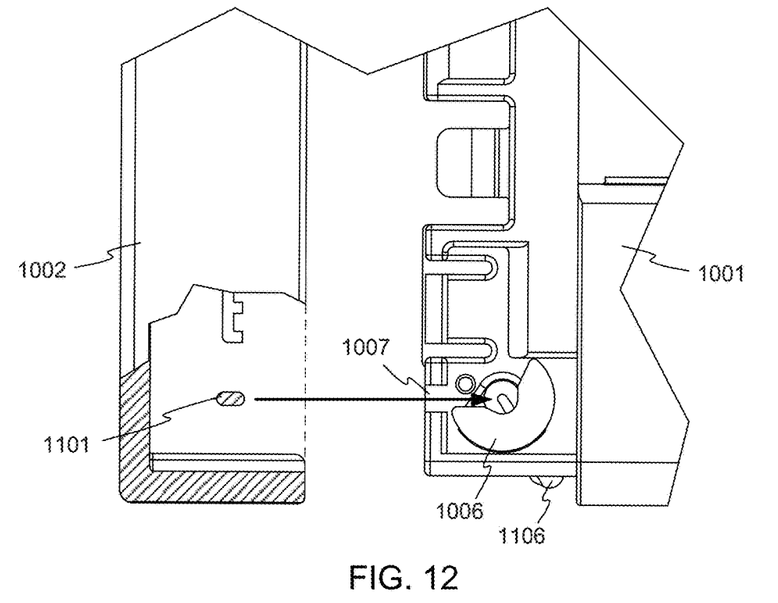
FIGS. 12-14 illustrate the operation of the latch of the wall plate of FIG. 10, in accordance with embodiments of the invention.
Figure 13:
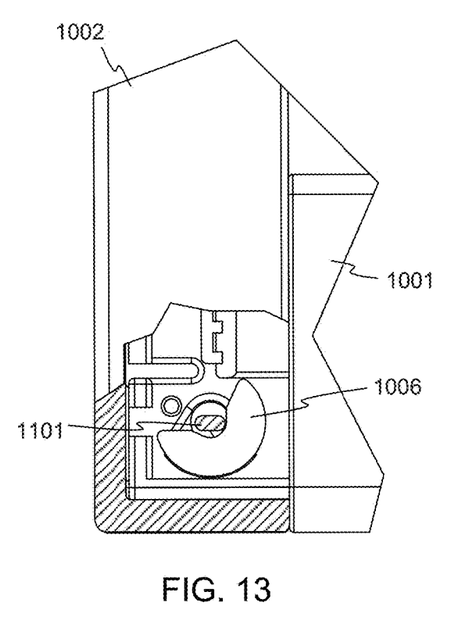
Figure 14:
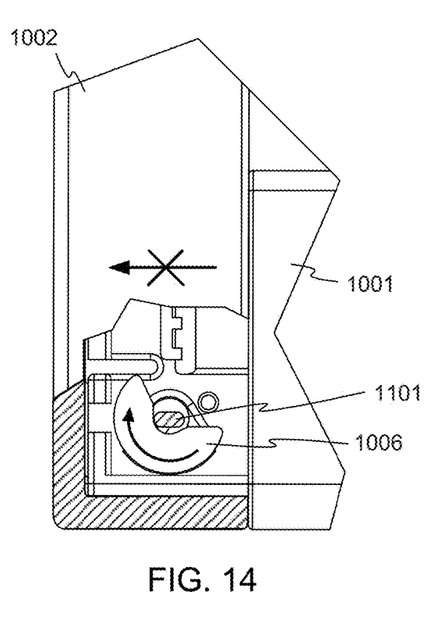

FIGS. 12-14 illustrate the use of one of the latches 1005 in more detail. Part of the trim piece 1002 has been cut away in FIGS. 12-14, to expose the post 1101. The trim piece 1002 is shown as completely detached from the base plate 1001 in FIG. 12, but in practice may typically be engaged with the base plate 1001 in the "open" position of the wall plate 1001. When the trim pieces 1002, 1003 are first positioned on the base plate 1001, the latches 1005 are oriented so that the partial discs 1006 do not block the ingress/egress slots 1007, thus permitting the posts 1101 on the trim pieces 1002, 1003 to move through the ingress/egress slots 1007. See FIG. 12 When the trim pieces 1002, 1003 are moved into the closed position on the base plate 1001, the latch arm 1106 is rotated (either by hand or with a tool) such that the partial discs 1006 block the ingress/egress slots 1007 and abut the posts 1101 to thereby prevent any relative movement between the base plate 1001 and the trim pieces 1002, 1003. FIG. 13 shows the trim piece 1002 moved into closed position against the base plate 1001, before the partial disc 1006 is rotated to its locked position. FIG. 14 shows the partial disc 1006 rotated into its locked position, preventing removal of the trim piece 1002.

Referring again to FIG. 11, portions 1107 of the trim pieces 1002, 1003 may be relieved to provide access for a tool for actuating the arms 1106. Preferably, the arms 1106 are not readily visible when the wall plate 1000 is installed on a wall.

Figure 15:
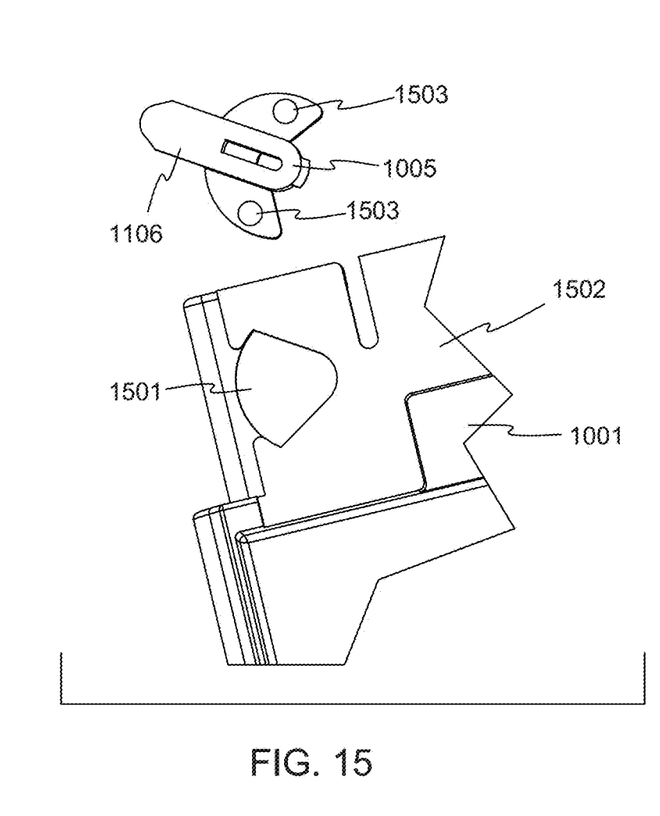
FIGS. 15 and 16 illustrate additional details of the latch of FIGS. 12-14, in accordance with embodiments of the invention.
Figure 16:
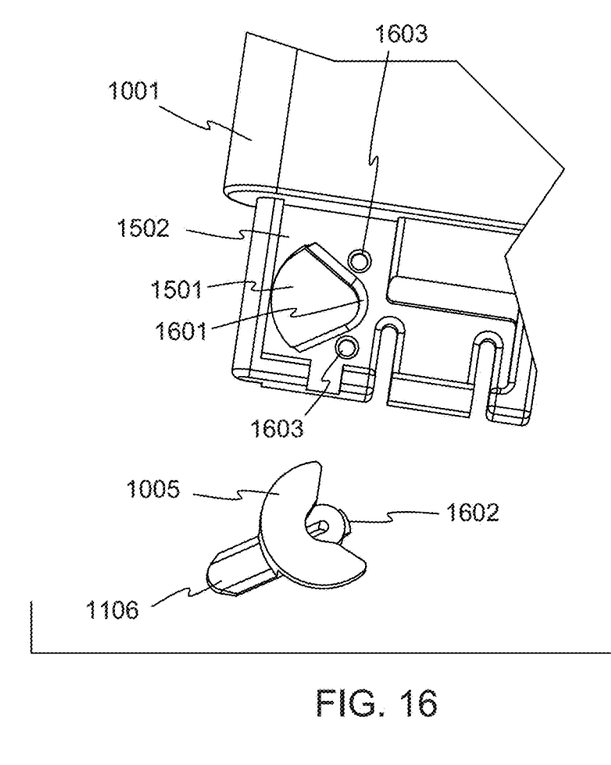

FIGS. 15 and 16 are cutaway rear and front perspective views of a portion of the base plate 1001 and one of the latches 1005, showing one example technique for assembly of the latches 1005 to the base plate 1001. An opening 1501 is provided in a wing portion 1502 of the base plate 1001. An arm 1106 may be inserted through the opening 1501, facilitated by a beveled edge 1601 on the opening 1501 and a snap feature 1602 on the latch 1005. Raised bumps 1503 on the latch 1005 may engage with depressions 1603 on the base plate 1001 (or vice versa) to provide detents at the locked and unlocked positions of the latch 1005.

The illustrated embodiment is but one example of a security feature that may be added to the wall plate system. Other security features and methods are certainly contemplated herein.

The base plate and trim pieces of the wall plate may be fashioned out of a variety of different materials, including plastic and metal. Moreover, they can be produced in a variety of different colors and finishes to meet any designer's request.

It will be understood that a wall plate embodying the invention may be installed in any orientation, and that the terms "top", "bottom", and "side" used herein are not limiting to a particular orientation. For example the trim pieces may be above and below the base plate. In some embodiments, the trim pieces may slide inward and outward in a direction parallel to a long dimension of the base plate, rather than the direction parallel to the short dimension of the base plate as shown in the drawings. In addition, a wall plate system embodying the invention may have different proportions or dimensions than the examples depicted in the drawings. The invention may be embodied in a multi-gang wall plate.

Moreover, in some embodiments the trim pieces are identical such that they can be used on either side of the base plate. This versatility reduces the overall cost of the wall plate by doubling the production volume of a single part (the trim piece) and thus realizing economies of scale that result in a lower part cost.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A wall plate system for covering an electrical component in an electrical box, the wall plate system comprising:
a base plate defining a central aperture and having a first side edge and a second side edge opposite the first side edge, and at least one first wing portion extending from the first side edge and at least one second wing portion extending from the second side edge;
first and second trim pieces, the first trim piece defining a first channel having a shape complementary to the shape of part of the at least one first wing portion, the first trim piece shaped and sized to slide onto the at least one first wing portion as the at least one first wing portion is received into the first channel, and the second trim piece defining a second channel having a shape complementary to the shape of part of the at least one second wing portion, the second trim piece shaped and sized to slide onto the at least one second wing portion as the at least one second wing portion is received into the second channel; and
a plurality of retaining mechanisms for attaching the two trim pieces to the base plate, wherein each retaining mechanism comprises at least one feature on the respective trim piece and at least one cooperating feature on the respective wing portion, wherein when the cooperating features of each retaining mechanism are engaged, the respective trim piece is attached to the base plate and is constrained to slide between an inward position and an outward position on the respective wing portion of the base plate.

2. The wall plate system of claim 1, wherein the plurality of retaining mechanisms is a plurality of first retaining mechanisms, the wall plate system further comprising:
a plurality of second retaining mechanisms that, when engaged, retain the two trim pieces in the inward positions relative to the base plate.

3. The wall plate system of claim 2, wherein when the plurality of second retaining mechanisms are engaged, a front face of the base plate and front faces of the two trim pieces combine to form a decorative front face of the wall plate system.

4. The wall plate system of claim 2, wherein the first and second retaining mechanisms are snap-fit connections.

5. The wall plate system of claim 2, further comprising
a mounting plate defining a central aperture and having first and second generally flat side portions extending from the central aperture;
wherein the mounting plate and the two trim pieces include complementary features that engage when the base plate and trim pieces are placed on the mounting plate and the trim pieces are moved to the inward positions, such that the base plate and trim pieces are retained to the mounting plate.

6. The wall plate system of claim 5, wherein the complementary features comprise (i) a first tab formed in an outside edge of the first side portion of the mounting plate and a second tab formed in an outside edge of the second side portion of the mounting plate, the first and second, tabs being offset from the side portions of the mounting plate and (ii) a first pocket provided in the first trim piece and a second pocket provided in the second trim piece, each pocket shaped and sized to receive a respective one of the tabs of the mounting plate when the trim pieces are moved to the inward positions.

7. The wall plate system of claim 2, wherein the plurality of first retaining mechanisms comprises (i) a first hook on the first side wing of the base plate and a second hook on the second side wing of the base plate and (ii) a first tab on the first trim piece and a second tab on the second trim piece, wherein the first hook is shaped and sized to snap over the first tab and the second hook is shaped and sized to snap over the second tab when the trim pieces are engaged with the base plate.

8. The wall plate system of claim 2, wherein the plurality of second retaining mechanisms comprises (i) a first lip on the first side wing portion of the base plate and a second lip on the second side wing portion of the base plate and (ii) a first ridge on the first trim piece and a second ridge on the second trim piece, wherein the first lip is shaped and sized to snap over the first ridge and the second lip is shaped and sized to snap over the second ridge when the trim pieces are moved to the inward positions.

9. The wall plate system of claim 1, further comprising at least one latch including an arm, wherein the arm can be used to move the latch between a locked position and an unlocked position, wherein when the at least one latch and the arm are in the locked position one of the two trim pieces is locked to the base plate, and when the at least one latch and the arm are in the unlocked position the one of the two trim pieces is movable outward from the base plate.

10. The wall plate system of claim 9, wherein (i) a slot is defined in the at least one wing portion extending from one of the side edges of the base plate, (ii) the at least one latch includes a partial disc, and (iii) the one of the two trim pieces includes a post feature, wherein, when the latch is in the unlocked position, the post feature of the trim piece is moveable through the slot to permit inward motion of the trim piece, and, when the latch is in the locked position, the partial disc blocks motion of the post feature through the slot, preventing outward motion of the trim piece.

11. The wall plate system of claim 10, further comprising at least one detent feature that holds the at least one latch in the locked position or in the unlocked position.

12. A method of installing a wall plate over an electrical component in an electrical box, the method comprising:
attaching a mounting plate to the electrical component or to the electrical box, the mounting plate including tabs that engage with the wall plate;
providing the wall plate, the wall plate comprising a base plate having first side edge with a first wing portion extending from the first side edge and having a second side edge with a second wing portion extending from the second side edge and the wall plate including first and second trim pieces, the first trim piece defining a first channel having a shape complementary to the shape of part of the first wing portion and the first trim piece shaped and sized to slide onto the first wing portion as the first wing portion is received into the first channel, and the second trim piece defining a second channel having a shape complementary to the shape of part of the second wing portion and the second trim piece shaped and sized to slide onto the second wing portion as the second wing portion is received into the second channel, the trim pieces movable inwardly and outwardly with respect to the base plate, and the trim pieces including features for engaging with the tabs of the mounting plate;
placing the wall plate over the mounting plate with the trim pieces in outward positions with respect to the base plate; and
moving the two trim pieces to inward positions with respect to the base plate such that the one or more features of the trim pieces engage with the one or more tabs of the mounting plate.

13. The method of claim 12, wherein the features of the trim pieces for engaging with the mounting plate are pockets formed in the trim pieces, and wherein moving the trim pieces to the inward positions comprises capturing the tabs in the pockets.

14. The method of claim 12, wherein moving the trim pieces to the inward positions comprises snapping the trim pieces to the base plate in the inward positions.

15. The method of claim 12, wherein the wall plate comprises at least one latch for locking the trim pieces to the base plate, and wherein the method further comprises actuating the at least one latch to lock the trim pieces to the base plate.

16. A wall plate for covering an electrical component in an electrical box, the wall plate comprising:
a base plate defining a central aperture, the base plate having a first side edge and a second side edge opposite the first side edge and at least one first wing portion extending from the first side edge and at least one second wing portion extending from the second side edge;
first and second trim pieces, the first trim piece defining a first channel having a shape complementary to the shape of part of the at least one first wing portion, the first trim piece shaped and sized to slide onto the at least one first wing portion as the at least one first wing portion is received into the first channel, and the second trim piece defining a second channel having a shape complementary to the shape of part of the at least one second wing portion, the second trim piece shaped and sized to slide respectively onto the at least one second wing portion as the at least one second wing portion is received into the second channel, wherein the first and second trim pieces slide between inward and outward positions with respect to the two side edges respectively such that when the two trim pieces are in the inward positions against the base plate, a front face the base plate and front faces of the two trim pieces combine to form a front face of the wall plate; and a plurality of retaining mechanisms for attaching the two trim pieces to the base plate, wherein each retaining mechanism comprises at least one feature on the respective trim piece and at least one cooperating feature on the respective wing portion wherein when the cooperating features of each retaining mechanism are engaged, the respective trim piece is attached to the base plate and is constrained to slide between an inward position and an outward position on the respective wing portion of the base plate.

17. The wall plate of claim 16, wherein each of the trim pieces includes one or more engagement features for engaging a mounting plate attached to the electrical box, and wherein the engagement features capture the wall plate to the mounting plate when the trim pieces are in the inward positions against the base plate.

18. The wall plate of claim 17, in combination with the mounting plate.

19. The wall plate of claim 17 wherein the plurality of retaining mechanisms is a plurality of first retaining mechanisms, the wall plate further comprising:

a plurality of second retaining mechanisms that, when engaged, retain the trim pieces in the inward positions.

20. The wall plate of claim 19, further comprising at least one latch having an arm, wherein the arm can be used to move the latch between a locked position and an unlocked position, wherein when the at least one latch and the arm are in the locked position the respective trim piece is locked to the base plate, and when the at least one latch and the arm are in the unlocked position the respective trim piece is movable outward from the base plate.

* * * * *